United States Patent [19]

Strikis

[11] 4,207,038
[45] Jun. 10, 1980

[54] POWER STEERING PUMP

[75] Inventor: Guntis V. Strikis, Belleville, Mich.

[73] Assignee: Ford Motor Company, Dearborn, Mich.

[21] Appl. No.: 901,915

[22] Filed: May 1, 1978

[51] Int. Cl.$^2$ .............................................. F01C 21/00
[52] U.S. Cl. ...................................... 418/75; 418/189
[58] Field of Search ................... 418/78, 79, 82, 75, 418/269, 189; 417/542, 310, 499

[56] References Cited

U.S. PATENT DOCUMENTS

| | | | |
|---|---|---|---|
| 2,624,287 | 1/1953 | Ilyin | 417/78 |
| 2,820,416 | 1/1958 | Compton | 418/78 |
| 3,007,419 | 11/1961 | Burt | 418/79 X |
| 3,614,266 | 10/1971 | Ciampa et al. | 417/310 X |
| 3,645,647 | 2/1971 | Ciampa et al. | 417/310 X |
| 3,999,466 | 12/1976 | Aschke | 91/499 |

FOREIGN PATENT DOCUMENTS 44-16620 of 1969 Japan ........................ 417/312

Primary Examiner—Carlton R. Croyle
Assistant Examiner—Edward Look
Attorney, Agent, or Firm—Donald J. Harrington; Keith L. Zerschling

[57] ABSTRACT

A power steering pump having a cam with an internal cam surface defining pumping arcs, a rotor in said cam, pumping elements preferably in the form of slippers carried by the periphery of the rotor in sliding engagement with the pumping arcs, flow control valve means having a movable valve element responsive to both static pressure and velocity pressure of the displaced fluid on the high pressure side of the pump wherein provision is made for decreasing the volume of fluid delivered by the pump at high pressure upon an increase in the speed of the rotor, and means for equalizing the pressure between the volume of fluid between two adjacent pumping elements located at a high pressure outlet port and a corresponding volume of fluid between two other adjacent slippers located at a low pressure inlet port as the pumping elements pass through their respective pump cycles.

3 Claims, 13 Drawing Figures

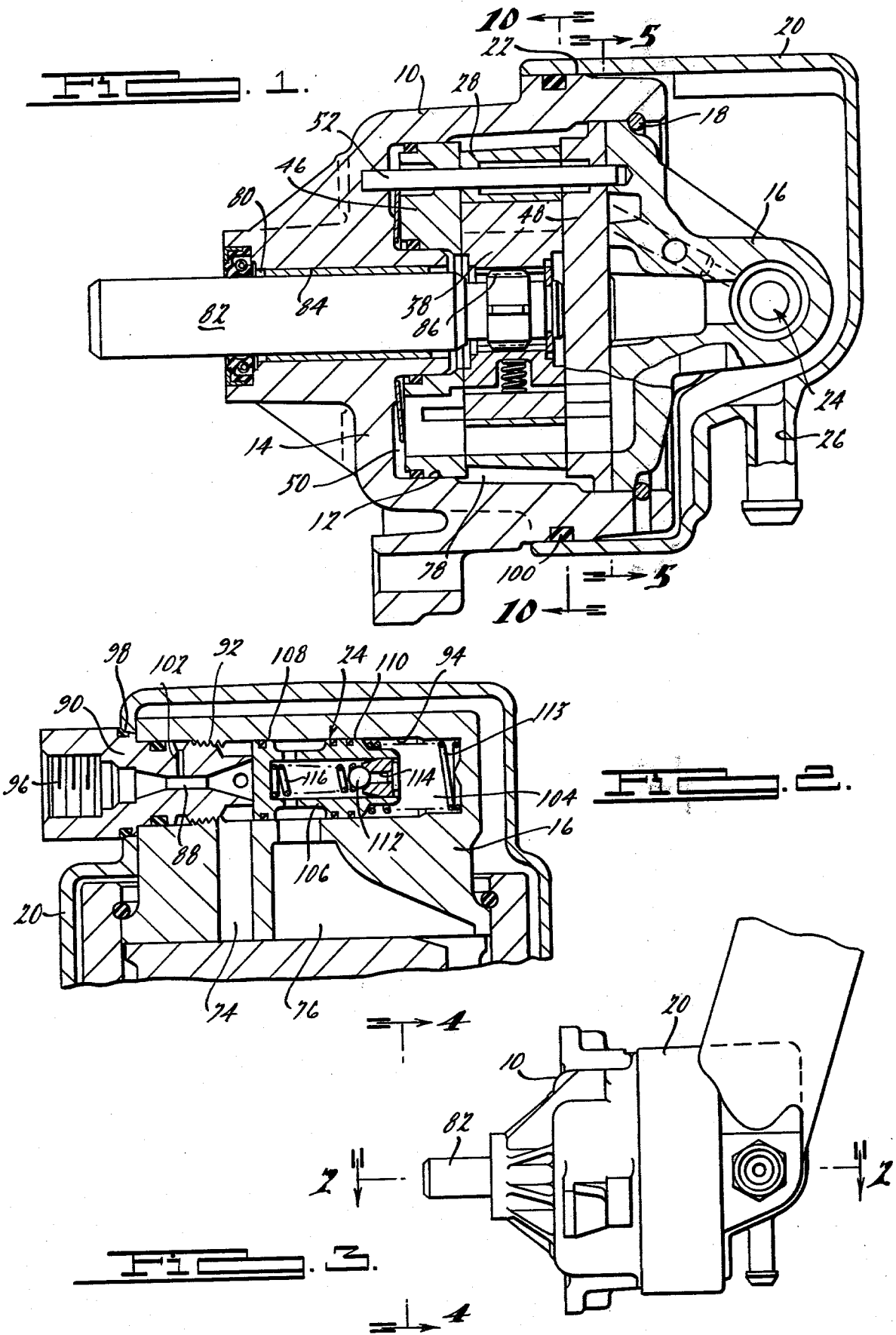

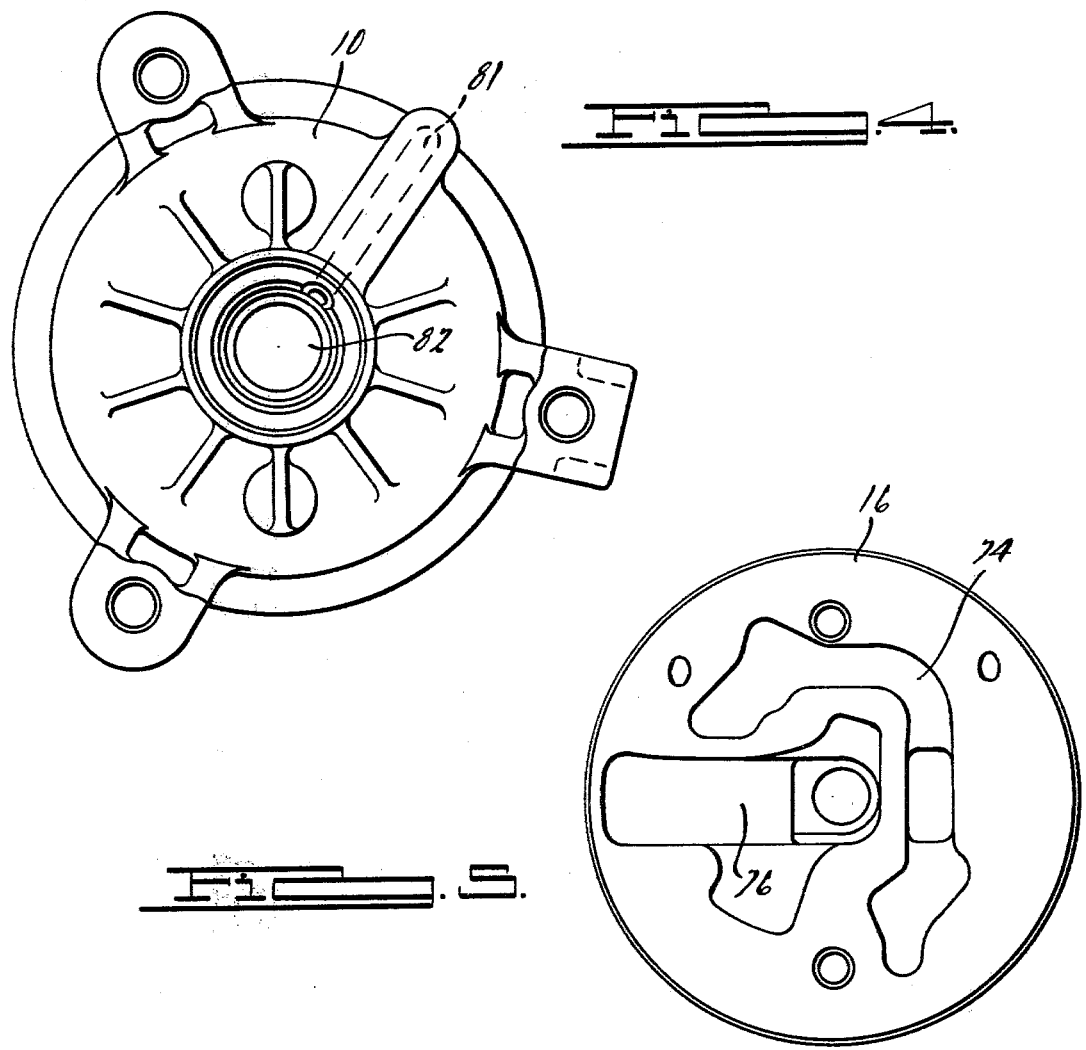
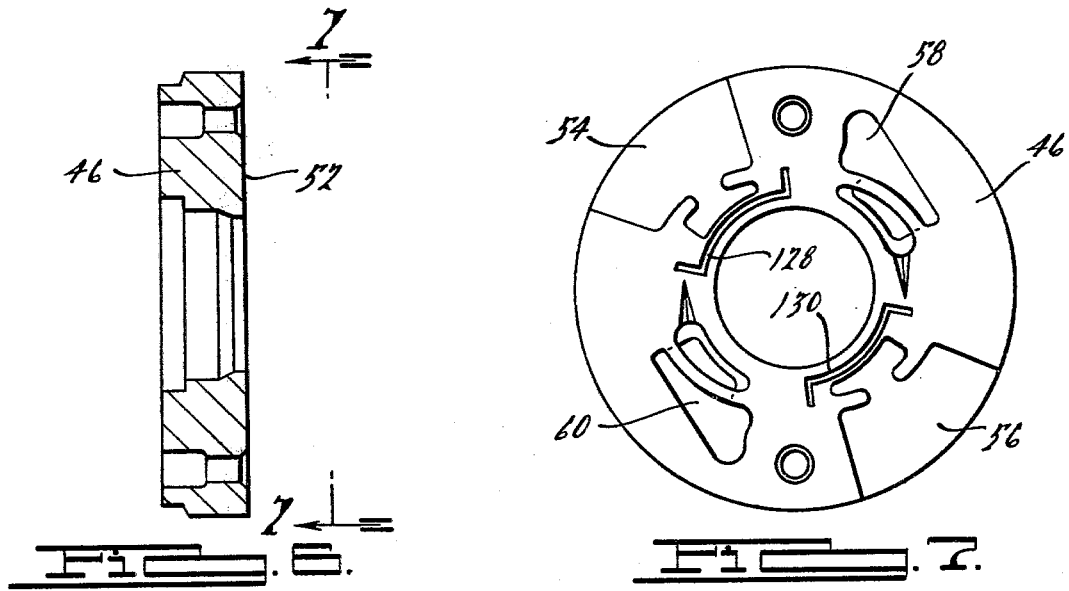

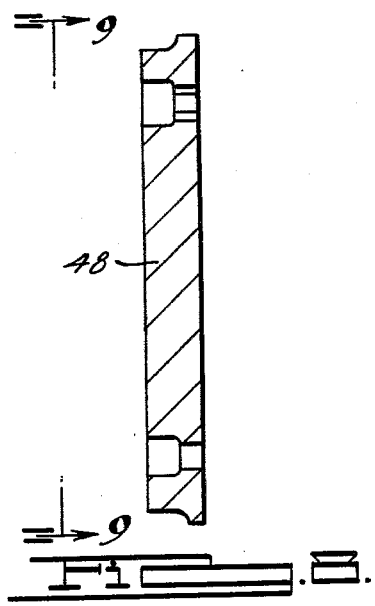
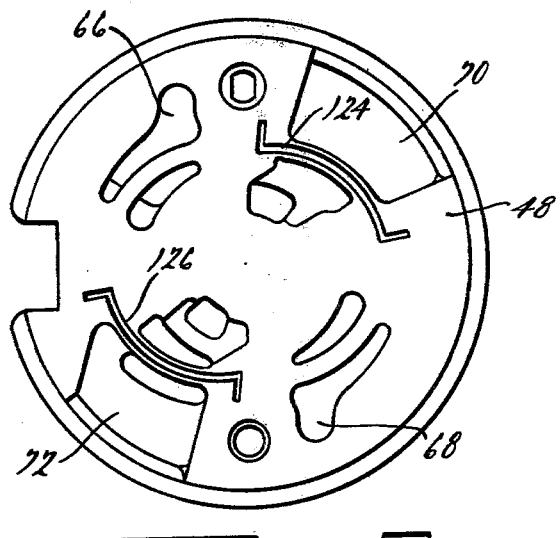
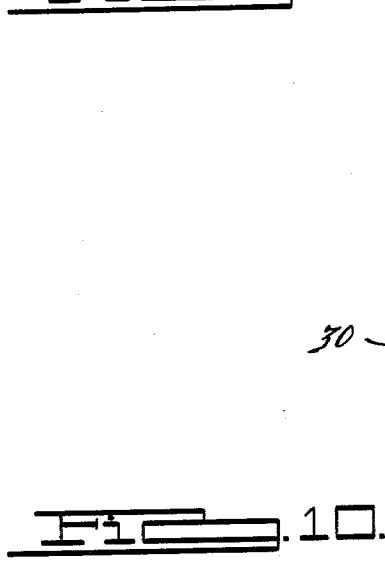
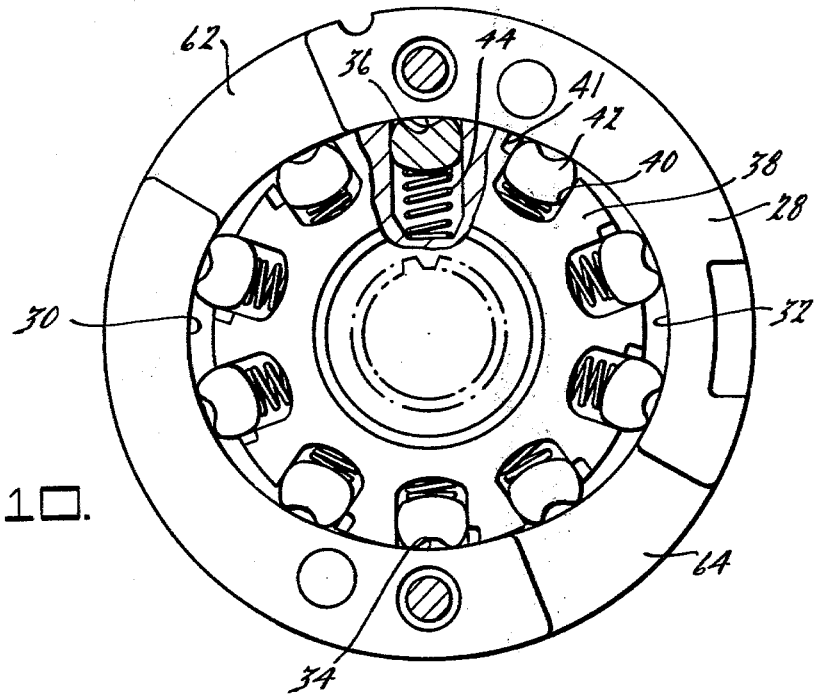
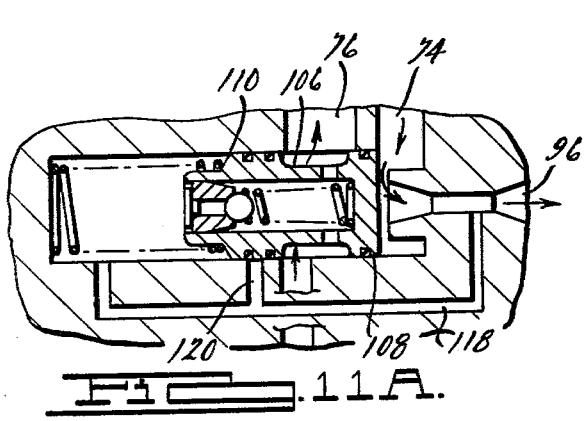
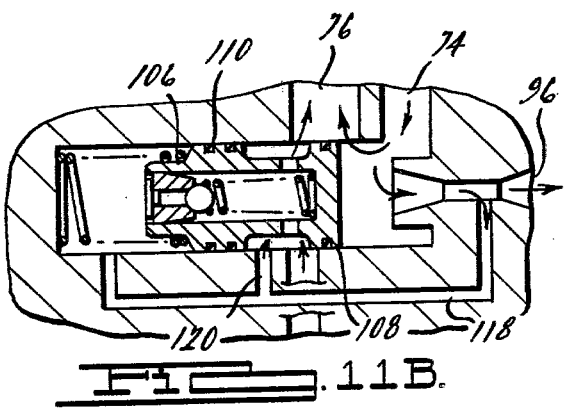

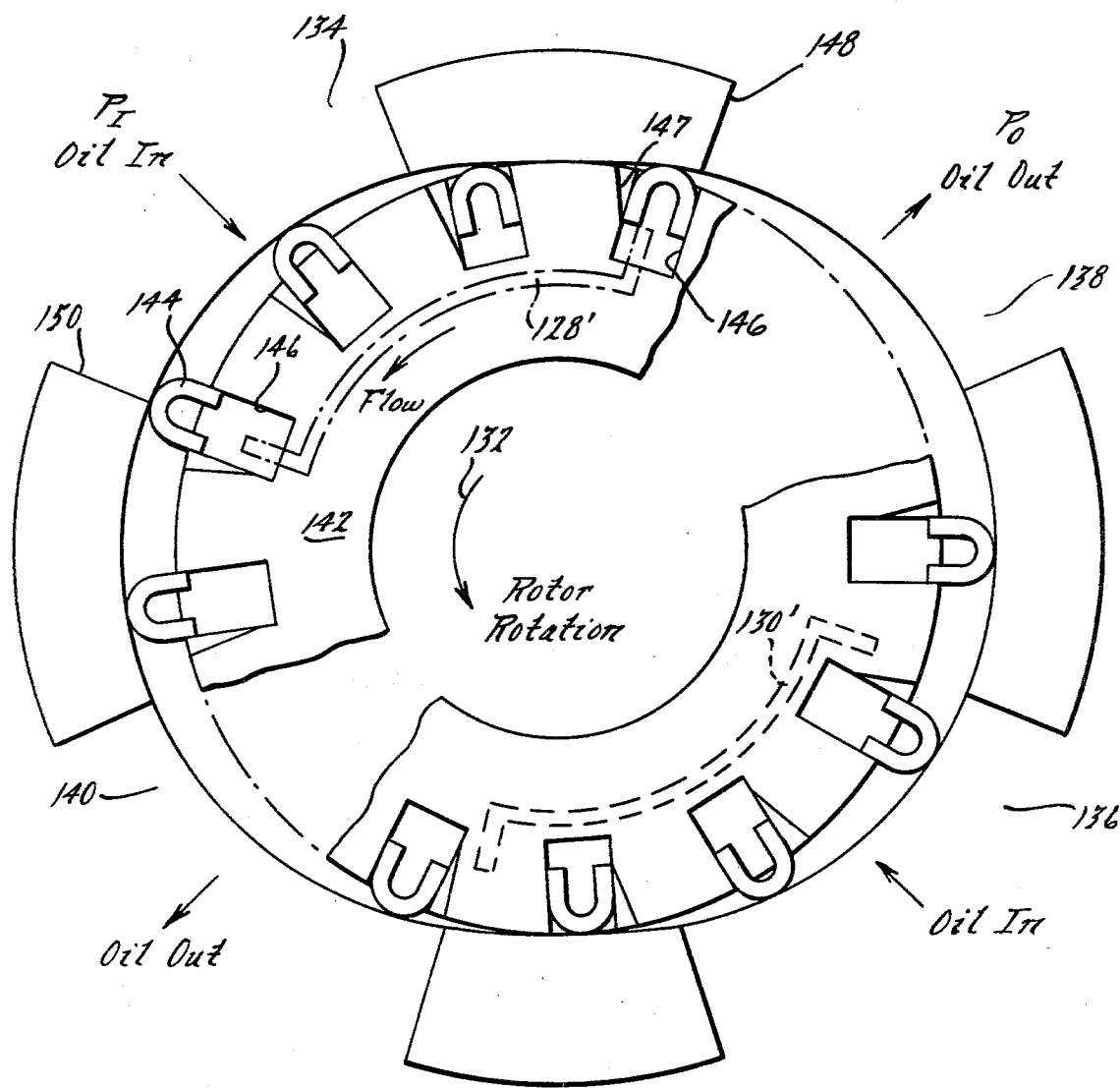

POWER STEERING PUMP

BRIEF DESCRIPTION OF THE INVENTION

My invention relates to improvements in power steering pumps such as slipper pumps of the kind disclosed in U.S. Pat. Nos. 3,614,266 and 3,645,647 as well as in pending patent application Ser. No. 885,912, filed Mar. 13, 1978, said patents and said application being assigned to the assignee of this invention.

The pump of my invention comprises a cam that surrounds a rotor. The cam has two pumping arcs situated 180° out of position with respect to each other. The rotor carries multiple pumping elements or slippers which engage the cam surface surrounding the rotor. End plates are situated on either side of the cam and rotor, and these plates are provided with ports which admit fluid to each of the two pumping chambers defined by the cam and the rotor.

The fluid is displaced by the pumping elements or slippers as they traverse the pumping arc from the inlet port to the outlet port. After adjacent pairs of pumping elements traverse the outlet high pressure port, the volume of fluid in the cavity located between those two slippers is pressurized at the pressure value of the outlet pressure. Normally in a pump of this kind the volume of fluid trapped between the two adjacent slippers is exhausted to the inlet port as the pumping elements further progress upon rotation of the rotor.

At the instant that two adjacent pumping elements traverse the outlet port, two other adjacent pumping elements are traversing the inlet port. They too define a volume of fluid therebetween that is equal in pressure to the inlet pressure of the pump. Upon further rotation of those two adjacent slippers, the low pressure fluid in the trapped volume between them is brought into communication with the outlet port. Thus there are two rapid changes in pressure of trapped volumes of fluid between adjacent slippers during each pumping cycle. There are two pumping cycles for each revolution of the rotor. This condition establishes pressure pulsations which may cause pump noise and which reduce pumping efficiency.

According to a feature of my invention I have made provision for equalizing the pressures between the two trapped volumes of fluid so that the trapped volume of fluid adjacent the pump outlet port is reduced and the trapped volume fluid adjacent the inlet port is increased. This is done by providing suitable pressure equalization channels in either or both of the pressure plates located adjacent the rotor in the cam. Some of the potential energy of the pressurized volume of fluid trapped between two adjacent pumping elements near the outlet port is recovered as the high pressure in that trapped volume is distributed to the low pressure volume trapped between two adjacent pumping elements near the inlet port.

According to another feature of my invention I have provided a flow control valve for controlling the pressure and flow whereby the pressure of the fluid displaced by the pump increases at a relatively fast rate upon an increase in rotor speed during low and intermediate speed operation and wherein the rate of fluid delivery by the pump at high speeds is relatively constant upon a further increase in the rotor speed. This reduces the effective horsepower required to drive the pump at high speeds and avoids excessive fluid delivery in pump applications such as vehicle power steering systems for automotive vehicles where the rotor is connected drivably to the vehicle engine and the pump normally tends to deliver an excessive amount of fluid to accomplish steering functions during high speed operation.

Another feature of my invention is a strategic porting of the flow control valve described in the foregoing paragraphs which causes a supercharger effect as fluid is returned to the pump circuit from the reservoir for the pump to the flow control valve. The direction of the flow from the reservoir to the flow control valve is such that the velocity pressure developed by the flow augments the pressure at the pump inlet port.

BRIEF DESCRIPTION OF THE FIGURES OF THE DRAWINGS

FIG. 1 is a cross-sectional view of a pump embodying the improvements of my invention.

FIG. 2 is a cross-sectional view taken along section line 2—2 of FIG. 3.

FIG. 3 is a side elevation view of the pump of FIG. 1.

FIG. 4 is an end view of the pump of FIG. 1 as seen from the plane of section line 4—4 of FIG. 3.

FIG. 5 is a cross-sectional view of the end plate as seen from the plane of section line 5—5 of FIG. 1.

FIG. 6 is a cross-sectional view of the pump end plate seen in FIG. 1.

FIG. 7 is an end view of the end plate of FIG. 6 as seen from the plane of section line 7—7 of FIG. 6.

FIG. 8 is a cross-sectional view of the other end plate in the assembly of FIG. 1.

FIG. 9 is an end view of the end plate of FIG. 8 as seen from the plane of Section line 9—9 of FIG. 8.

FIG. 10 is a subassembly view of the rotor and cam of the assembly of FIG. 1 as seen from the plane of section line 10—10 of FIG. 1.

FIGS. 11A and 11B are schematic cross-sectional views of the valve assembly shown in FIG. 2 with the movable spool portion of the valve assembly in the low-speed condition and the high-speed condition, respectively.

FIG. 12 is a schematic representation of a rotor and cam assembly of the type shown in FIG. 10. The view of FIG. 12 is a schematic cross-sectional view taken on spaced, parallel cross-sectional planes to show the equalizer passages of either side of the rotor.

PARTICULAR DESCRIPTION OF THE INVENTION

In FIG. 1 numeral 10 designates a pump housing which may be formed of cast aluminum or other suitable material. It is provided with a pump cavity 12, the left hand end of which is closed by housing wall 14. The right hand end of the cavity 12 is closed by end cover 16 which is in the form of a plate received in the opening 12 and held in place by a snap ring 18. A fluid reservoir 20 formed of fiberglass or some other suitable material is situated with its margin surrounding the margin 22 of the housing 10. It encloses the end cover plate 16, the latter forming a valve housing for the valve assembly indicated generally by reference numeral 24.

The interior of the reservoir 20 communicates with return flow passage 26, which communicates with the low pressure side of a fluid pressure operated mechanism such as a power steering gear for an automobile.

A pump cam 28 is situated in the housing opening 12. As best seen in FIG. 10, cam 28 defines a pair of pumping arcs 30 and 32 which are joined together by two sealing arcs 34 and 36 to define a continuous cam surface of irregular shape. The periphery of the rotor 38 is provided with multiple recesses 40 each of which receives a fluid pumping element such as slipper 42. In the embodiment disclosed each recess is provided with a radial opening that receives a spring 44 which urges the associated pumping element or slipper radially outward into camming engagement with the internal cam surface.

A lower pressure plate 46 is situated on the left hand side of the rotor 38 as seen in FIG. 1, and an upper pressure plate 48 is located on the right hand side of the rotor 48. End plate 16, which forms the valve body for the flow control and pressure relief valve assembly 24, is received within the opening 12 in the pump housing and is situated directly adjacent the upper pressure plate 48. The lower pressure plate 46, the rotor 38, the upper pressure plate 48 and the end plate 16 are held in axially stacked relationship and are urged into sealing engagement, one with respect to the other, by fluid pressure in the inner pressure chamber 50 at the base of the opening 12. Snap ring 18 provides the force reaction for the pressure force developed by the pressure in the pressure chamber 50. One or more pilot pins 52 received through the cam 28 and the two pressure plates as well as the end plate to hold the assembly in proper angular registry.

The lower pressure plate 46 is seen in the detailed views of FIGS. 6 and 7. The right hand surface of the pressure plate 48 is seen in FIG. 6 at 52. It is formed with low pressure ports 54 and 56 and with high pressure ports 58 and 60. Low pressure ports 54 and 56 communicate respectively with low pressure ports 62 and 64 in the cam 28. The low pressure ports communicate with the inlet portion of the pumping chamber defined by the cam ring and the pump rotor. The spaces located between two adjacent pumping elements or slippers communicate with the inlet ports as they move through the pumping arc and expand in volume. The spaces between the same two adjacent pumping elements or slippers, as they decrease in volume upon continued rotation of the rotor through the pumping cycle, communicate with high pressure ports 58 and 60. They communicate also with high pressure ports 66 and 68 located in upper pressure plate 48. The inlet ports in the upper pressure plate 48 corresponding to the inlet ports 54 and 56, respectively, in the lower pressure plate 46, are shown at 70 and 72.

The high pressure ports communicate with pump outlet passage 74 as seen in FIG. 2 and the low pressure ports communicate with low pressure return passage 76, also seen in FIG. 2. These passages are located in the end plate 16 which contains the valve assembly 24. This can best be seen by referring to FIG. 5 which shows the passages in the face of the end plate 16 that engages the upper pressure plate 48.

The cam ring 28, which is received within the opening 12 of the housing, defines with the housing a low pressure chamber 78. That space is in fluid communication with the seal chamber 80 seen in FIG. 1, suitable internal porting 81, as shown in FIG. 4, being formed in the housing 10 for that purpose.

Drive shaft 82 for the rotor 38 extends through an opening 84 formed in the housing 10 and is journalled in that opening by a suitable bushing as shown. Shaft 82 is splined at 86 to an internally splined opening formed in the rotor 38.

The high pressure passage 74 is in communication with venturi throat 88 formed in the venturi flow control element 90. That element is threaded at 92 within a threaded portion of the valve opening 94. The other end of the venturi passage 88 communicates with outlet passage 96 formed in a venturi element 90.

Element 90 is provided with a shoulder 98 which registers with an opening formed in the reservoir 20 to hold the reservoir fast against the end plate 16. That connection and the registry of the margin of the reservoir 20 with the outer periphery of the housing 10 provides stability for the reservoir. The margin of the reservoir 20 is provided with an O ring or other seal 100.

Venturi pressure passage 102 is formed in the venturi element 90, and it is in communication with the throat 88. Internal passages formed in the end plate 16 connect the passage 102 with the right hand end 104 of the valve opening 94. Valve spool 106, having spaced valve lands 108 and 110, is slidably positioned in the valve opening 94. Valve spring 113 is situated at the end 104 of the opening 94 and urges the valve element 106 in a left hand direction as seen in FIG. 2. The outlet pressure in passage 74 tends to urge the valve element 106 in a left hand direction against the opposing force of the spring 113. As it does this, land 108 uncovers port 76 thereby bypassing the pumped fluid to the low pressure side of the pump. The fluid that is not bypassed is distributed through the venturi throat 88 to the outlet passage 96. As the pump speed increases, the flow through the venturi throat increases, thereby establishing a reduced venturi pressure which is transmitted to the end 104 thereby causing a reduced pressure at that point that causes the spool valve to move to a more fully opened position thereby bypassing more fluid and reducing the effective outlet flow. Conversely, a decrease in pump speed will result in a build-up in pressure in the end 104 thereby augmenting the spring force and causing a decreased bypass flow.

A pressure relief valve 112 registers with a relief orifice 114 in the valve element 106. It is normally closed by valve spring 116. Upon an excessive pressure buildup the pressure transmitted to the right hand side of the valve opening will cause the valve 112 to become unseated thereby bypassing fluid to the inlet side of the pump and relieving the excessive pressure.

FIGS. 11A and 11B show in generally schematic fashion the valve structure of FIG. 2 and reference will be made to it to explain the operation of the valve. FIG. 11A shows a low-speed, high-pressure condition of the valve, and FIG. 11B shows the high speed condition where part of the outlet flow of the pump is bypassed.

In the valve of FIGS. 11B and 11B fluid is bypassed from the pump outlet pressure passage 74 to low pressure port 76 when the valve land 108 uncovers the port 76. Any fluid not bypassed through port 76 will be transmitted to the outlet passage 96, thereby creating a venturi pressure which is distributed to internal passage 118 from the throat 102 to the opposite side of the valve element 106. After the pump speed increases above a predetermined value, a second control port 120 becomes uncovered by land 110. This port 120 communicates with the passage 118. When the port 120 is uncovered, the low pressure area that communicates with port 122 is brought into communication with passage 118. Port 122, in turn, communicates with the reservoir and fluid is returned from the reservoir to the valve assembly through it. As soon as passage 118 becomes subjected to lower pressure, valve element 106 will be caused to shift further away from the venturi throat thereby increasing the bypass flow from port 74 to port 76 and decreasing the outlet flow through the passage 96. Thus a decrease in the rate of pressure build up upon increase in pump speed occurs and this causes a so-called "drooper" effect. A drooper effect is achieved in other ways in other prior art constructions, such as those shown in U.S. Pat. Nos. 3,253,607 and 3,349,714. The drooper effect in the '607 patent is achieved by using a pair of flow metering orifices and controlling the effectiveness of one of the orifices as flow across the mouth of the orifice increases. The drooper effect of the '714 patent is achieved by having a variable geometry metering pin register with an orifice in the outlet flow circuit of the pump. The drooper effect of my instant invention is achieved in a much simpler fashion, and it is characterized by improved reliability.

FIG. 11B shows the valve element 106 in a position where the 1 and 110 uncovers the port 120, which corresponds to the high speed condition.

Upper pressure plate 48 as well as the lower pressure plate 46 is provided with pressure equalizer passages. Each pressure plate has a pair of passages, one corresponding to each of the pumping chambers of the pump. Equalizer passages for the upper pressure plate 48 are shown at 124 and 126, which span the inlet ports 70 and 72 respectively. They are arcuate in form, and their ends are located close to the cutoff and opening edges of the ports to which they are adjacent. The equalizer pressure passages for the lower pressure plate 46 are shown at 128 and 130. As in the case of the equalizer pressure passages for the upper pressure plate, passages 128 and 130 span the inlet ports 54 and 56; and they terminate a location adjacent the individual edges of these ports.

In order to explain the operation of the equalizer pressure passages, reference will be made to FIG. 12 where I have shown in schematic fashion a cam and rotor assembly. I have identified the equalizer pressure passages by reference characters 128' and 130' which correspond to the passages 128 and 130 of FIG 7. The direction of rotor rotation is illustrated by the rotational vector 132. The two low pressure oil inlet ports are identified in the schematic sketch of FIG. 12 by reference characters 134 and 136. The two outlet high pressure ports are identified in the schematic sketch of FIG. 12 by reference numerals 138 and 140. The rotor 142, which corresponds to the rotor 38 in the embodiment of FIGS. 1 through 9, carries slippers 144 located in radial pockets 146. The equalizer pressure passage 128' of the rotor 142 is positioned as shown in FIG. 12 establishing communication between the pockets located at the 1:30 o'clock position and the 10:00 o'clock position. The fluid cavity located between two adjacent slippers at the 11:30 o'clock and the 1:30 o'clock positions becomes trapped after the second of the pair of slippers passes the cutoff edge 148 of the high pressure outlet port 138. At the same instant the slipper at the 10:00 o'clock position has just passed the cutoff edge 150 of the oil inlet port 134. Thus the fluid trapped in the cavity between the slippers at the 10:00 o'clock position and the 8:30 o'clock position is equal in pressure to the pressure at the inlet port 134. Conversely, the pressure that exists in the trapped volume of fluid between the slippers at the 11:30 o'clock position and the 1:30 o'clock position is at the high pressure that exists in the outlet port 138.

It should be noted that the leading edge of each slipper pocket 146 is provided with an angular slot 147 which permits the pocket 146 to communicate with the pumping chamber between that slipper and the next adjacent preceding slipper. Corresponding notches are shown also in FIG. 10 at 41.

The pressure equalizer passage 128' will cause a higher pressure to be distributed to the trapped volume of fluid at the lower pressure, thereby tending to equalize the pressures and permitting a recovery of some of the potential energy of the fluid. When the trapped volume of high pressure reaches the oil inlet port 134 upon continued rotation of the rotor, the pressure change that occurs is less severe and pressure pulsations tend to be modified or reduced. The same is true for the trapped volume of fluid at the lower pressure port as it is brought into communication with the high pressure outlet port 140 upon continued rotation of the rotor. The pressure difference between that trapped volume of fluid and the pressure at the outlet port 140 is reduced. This pressure equalization improves the pumping efficiency and reduces pump noise due to large pressure pulsations.

Equalizer pressure passage 130' functions in a similar fashion on the opposite side of the pump as fluid is transferred from the inlet port 136 and to the outlet port 138.

Having thus described a preferred embodiment of my invention, what I claim and desire to secure by U.S. Letters Patent is:

1. A positive displacement pump comprising a pump rotor and a cam ring surrounding said rotor and having a noncircular inner surface, said rotor and said cam ring defining therebetween crescent shaped pumping cavities, end plates situated on either side of said rotor and said cam ring, said end plates, said cam ring and said rotor being disposed within a pump housing, a plurality of recesses formed in the periphery of said rotor, a pumping element registering with each recess and disposed in sliding engagement with said cam ring, fluid inlet ports and fluid outlet ports communicating with said pumping cavities in arcuately displaced locations one with respect to the other, each pair of pumping elements and the cooperating end plates and cam ring defining a fluid cavity, a first fluid cavity defined by a first pair of said pumping elements and a second fluid cavity defined by a second pair of said pumping elements being disposed at a first angular position of said rotor adjacent an inlet port and an outlet port, respectively, and equalizer pressure passage means formed in said end plates, said equalizer pressure passage means being angularly situated with respect to said ports to establish fluid communication between said first pressure cavity and said second pressure cavity at the angular rotor position at which said first pressure cavity begins to communicate with an outlet port and said second pressure cavity begins to communicate with an inlet port whereby the higher pressure in said second cavity is reduced as the first cavity is prepressurized.

2. A positive displacement pump comprising a pump rotor and a pump cam surrounding said rotor, said cam being out-of-round and its internal surface cooperating with said rotor to define two crescent shaped pumping chambers situated 180° out of phase with respect to each other, members defining a wall on either side of said rotor and cooperating with said rotor and said cam to define said pumping chambers, a separate inlet port and a separate pump outlet port communicating with each crescent pumping chamber, a plurality of recesses formed in the periphery of said rotor, a pumping element situated in each recess and arranged in sliding engagement with the internal surface of said cam, each adjacent pair of pumping elements cooperating with said cam, said rotor and said walls to define a pressure cavity, the pressure cavity defined by a first of said pairs of pumping elements communicating with the pumping cavity defined by a second of said pair of pumping elements during rotation of said rotor at the rotor position where said first cavity is moved out of registry with a first high pressure port and the pressure cavity associated with said second pair of pumping elements is moved out of registry with respect to a first low pressure inlet port, an equalizer pressure passage means establishing such communication.

3. The combination as set forth in claim 2 wherein the fluid in the pressure cavity defined by a third adjacent pair of said pumping elements communicates with the pressure cavity defined by a fourth adjacent pair of said pumping elements when the former pumping chamber moves out of registry with respect to another high pressure port and the pressure cavity defined by the said fourth pair of said pumping elements moves out of registry with another inlet port, said communication being established by second equalizer pressure passage means.

* * * * *